United States Patent
Komulainen et al.

(10) Patent No.: US 6,721,293 B1
(45) Date of Patent: Apr. 13, 2004

(54) UNSUPERVISED ADAPTIVE CHIP SEPARATION FILTER FOR CDMA TERMINAL

(75) Inventors: Petri Komulainen, Oulu (FI); Markku J. Heikkila, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/521,439

(22) Filed: Mar. 7, 2000

Related U.S. Application Data (63) Continuation-in-part of application No. 09/518,031, filed on Mar. 3, 2000.
(60) Provisional application No. 60/123,603, filed on Mar. 10, 1999.

(51) Int. Cl.$^7$ .............................................. H04B 7/216
(52) U.S. Cl. ...................... 370/335; 370/320; 370/342; 370/441
(58) Field of Search ................................ 370/320, 330, 370/335, 342, 441, 479; 375/130, 142, 147, 148, 150, 347; 455/132

(56) References Cited

U.S. PATENT DOCUMENTS

| | | | | |
|---|---|---|---|---|
| 5,305,349 A | * | 4/1994 | Dent ........................... | 370/209 |
| 5,442,661 A | * | 8/1995 | Falconer ...................... | 370/479 |
| 5,548,616 A | | 8/1996 | Mucke et al. ................ | 375/295 |
| 5,566,201 A | | 10/1996 | Ostman ...................... | 375/200 |
| 5,596,571 A | | 1/1997 | Gould et al. ................. | 370/335 |
| 5,796,757 A | | 8/1998 | Czaja .......................... | 371/46 |
| 5,796,776 A | * | 8/1998 | Lomp et al. ................. | 375/222 |
| 5,799,010 A | * | 8/1998 | Lomp et al. ................. | 370/335 |
| 5,870,425 A | * | 2/1999 | Piaget et al. ................. | 375/147 |
| 6,049,535 A | * | 4/2000 | Ozukturk et al. ........... | 370/335 |
| 6,141,374 A | * | 10/2000 | Burns .......................... | 375/152 |
| 6,157,619 A | * | 12/2000 | Ozluturk et al. ............. | 370/252 |
| 6,163,563 A | * | 12/2000 | Baker et al. ................. | 375/130 |
| 6,212,174 B1 | * | 4/2001 | Lomp et al. ................. | 370/335 |
| 6,215,778 B1 | * | 4/2001 | Lomp et al. ................. | 370/335 |
| 6,229,843 B1 | * | 5/2001 | Lomp et al. ................. | 375/150 |
| 6,272,168 B1 | * | 8/2001 | Lomp et al. ................. | 375/222 |
| 6,377,607 B1 | * | 4/2002 | Ling et al. ................... | 375/130 |
| 6,466,566 B1 | * | 10/2002 | De Gaudenzi et al. ..... | 370/342 |
| 6,609,003 B1 | * | 8/2003 | Park et al. ................... | 455/436 |

OTHER PUBLICATIONS

S. Haykin, *Adaptive Filter Theory*. Upper Saddle River, NJ: Prentice Hall, third ed., 1996.

A. Duel–Hallen, J. Holtzman, and Z, Zvonar, *Multiuser Detection for CDMA Systems*, IEEE Personal Communications, pp. 46–58, Apr. 1995.

M.K. Varanasi and B. Aazhang, *Multistage Detection in–Asynchronous Code–Division Multiple Access Communications*, in IEEE Trans. on Communications, vol. 38, No. 4, Apr. 1990.

(List continued on next page.)

Primary Examiner—Wellington Chin
Assistant Examiner—Jamal A. Fox
(74) Attorney, Agent, or Firm—Harrington & Smith, LLP (57) ABSTRACT

A receiver for use in a CDMA telecommunications system is disclosed. The receiver includes at least one antenna for receiving signals from a CDMA channel, where the received signals include a desired user signal. The receiver also includes combining circuitry, for performing chip waveform filtering and maximal ratio combining, to produce mutually correlated chip estimates of the received signals. The receiver further includes an adaptive separator, for adaptively separating the mutually correlated chip estimates, and a correlator, for despreading the output of the adaptive separator to obtain an estimate for data symbols of the desired user signal. In addition, the receiver further includes estimating circuitry, coupled to the combining circuitry, for estimating a response of the channel, where the combining circuitry utilizes the channel response estimate as a reference.

10 Claims, 5 Drawing Sheets

OTHER PUBLICATIONS

S.M. Kay, *Fundamentals of Statistical Signal Processing: Estimation Theory*, Prentice Hall, New Jersey, 1993.

H. Liu and M.D. Zoltowski, *Blind Equalization in Antenna Array CDMA Systems*, IEEE Transactions on Signal Processing, vol. 45, No. 1, pp. 161–172, Jan. 1997.

J.R. Treichler, C.R. Johnson, Jr., Larimore, *Theory and Design of Adaptive Filters*. John Wiley & Sons, 1987.

S.L.Miller, *An Adaptive Direct–Sequence Code–Division Multiple Access Receiver for Multiuser Interference Rejection*, IEEE Transactions on Communications, vol. 43, pp. 1746–1755, Feb.–Apr., 1995.

M. Latva–aho, *Advanced Receivers for Wideband CDMA Systems*. Doctoral thesis, Department of Electrical Engineering, University of Oulu, Finland, 1998.

M.L. Honig, U. Madhow and S. Verdu, *Blind Adaptive Multiuser Detection*, IEEE Transactions on Information Theory, vol. 41, pp. 944–960, Jul. 1995.

N. Zecevic and J.H.Reed, *Blind–Adaptation Algorithms for Direct–Sequence Spread–Spectrum CDMA Single–User Detection*, IEEE International Vehicular Technology Conference, VTC'97, pp. 2133–2137, May 1997.

Y. Bar–Ness and J.B. Punt, *Adaptive Bootstrap CDMA Multi–User Detector*, Wireless Personal Communications, Kluwer Academic Publishers, vol. 3, No. 1, pp. 55–71, 1996.

P.Komulainen, Y Bar–Ness and J. Lilleberg, *Simplified Bootstrap Adaptive Decorrelator for CDMA Downlink*, IEEE International Conference on Communications, ICC'98, Atlanta, USA, Jun. 1998, pp. 380–384.

D.P. Taylor, G.M. Vitetta, B.D. Hart and A. Mammela, *Wireless Channel Equalisation*, European Transactions on Telecommunications, vol. 9, No. 2, pp. 117–143, 1998.

S. Werner and J. Lilleberg, *Downlink Channel Decorrelation on CDMA Systems With Long Codes*, submitted to ICC'99, 1999.

I. Kaya, A.R. Nix and R. Benjamin, *Exploiting Multipath Activity Using Low Complexity Equalization Techniques for High Speed Wireless LAN's*, IEEE International Vehicular Technology Conference, VTC'98, Ottawa, Canada, May 1998, pp. 1593–1597.

Cacopardi et al., "*Channel Estimation and Tracking of an Indoor Orthogonal Multicarrier DS–CDMA System Using Measured Channel Delay Profiles*", May 1996, pp. 1559–1563, the 1996 IEEE Journal.

* cited by examiner

UNSUPERVISED ADAPTIVE CHIP SEPARATION FILTER FOR CDMA TERMINAL

This is a continuation in part of U.S. patent application Ser. No. 09/518,031, entitled "Unsupervised Adaptive Chip Separation Filter for CDMA Terminal," by Petri Komulainen and Markku J. Heikkilä, filed Mar. 3, 2000, which claims priority under 35 U.S.C. §119(e) from Provisional Patent Application No. 60/123,603, filed Mar. 10, 1999, entitled "Unsupervised Adaptive Separation Filter" by Petri Komulainen and Markku J. Heikkilä. The disclosure of this Provisional Patent Application is incorporated by reference herein in its entirety.

FIELD OF THE INVENTION

This invention relates generally to communications systems, and, in particular to a receiver that performs adaptive channel equalization.

BACKGROUND OF THE INVENTION

CDMA systems are based on a digital, wideband, spread spectrum technology which transmits multiple, independent user signals across an allocated segment of the radio spectrum. In CDMA, each user signal includes a different orthogonal code and a pseudo random binary sequence that modulates a carrier, spreading the spectrum of the waveform, and thus allowing a large number of user signals to share the same frequency spectrum. The user signals are separated in the receiver with a correlator which allows only the signal with the selected orthogonal code to be despread. The other user signals, whose codes do not match, are not despread, and as such, contribute to system noise. The signal to noise ratio of the system is determined by the ratio of the desired signal power to the sum of all interfering signals, enhanced by the system processing gain and the ratio of the spread bandwidth to the baseband data rate.

In the downlink (base station to mobile terminal) of a cellular direct-sequence code division multiple access (DS-CDMA) system, various users are multiplexed to the channel typically by orthogonal spreading codes. This is also the case with the 3rd generation wideband CDMA (WCDMA) standards currently proposed, where different spreading factors and variable user data rates can be supported simultaneously. However, due to multipath propagation and frequency-selective fading, the orthogonality between the various users' waveforms is degraded, and multiple access interference impairs the performance of the receiver. For an uplink (mobile terminal to base station) receiver, several multiuser detection schemes have been proposed in order to alleviate multiple access interference. However, the mobile terminal cannot accommodate the same degree of computational complexity as the base station.

Several adaptive algorithms, based on stochastic gradient methods and minimum mean-squared-error (MMSE) criterion, have been proposed as a means of low-complexity interference suppression for CDMA receivers. In the presence of known training data sequences, a least-mean-square (LMS) algorithm can be used.

Reference in this regard may be had to S. L. Miller, "An Adaptive Direct-Sequence Code-Division Multiple Access Receiver for Multiuser Interference Rejection," *IEEE Transactions on Communications*, vol. 43, pp. 1746–1755, February–April 1995.

Adequate training for the LMS can also be provided by a conventional RAKE receiver, as is disclosed in M. Latvaaho, *Advanced receivers for wideband CDMA systems*. Doctoral thesis, Department of Electrical Engineering, University of Oulu, Finland, 1998.

In order to avoid the need for training, blind adaptation schemes have been proposed as described in: M. L. Honig, U. Madhow and S. Verdú, "Blind adaptive multiuser detection," *IEEE Transactions on Information Theory*, vol. 41, pp. 944–960, July 1995, and also described in: N. Zecevic and J. H. Reed, "Blind adaptation algorithms for direct-sequence spread-spectrum CDMA single-user detection," *IEEE International Vehicular Technology Conference*, VTC'97, May 1997, pp. 2133–2137.

Y. Bar-Ness and J. B. Punt, "Adaptive bootstrap CDMA multi-user detector," *Wireless Personal Communications*, Kluwer Academic Publishers, vol. 3, no. 1, pp. 55–71, 1996, and P. Komulainen, Y. Bar-Ness and J. Lilleberg, "Simplified bootstrap adaptive decorrelator for CDMA downlink," *IEEE International Conference on Communications*, ICC'98, Atlanta, USA, June 1998, pp. 380–384 both disclose algorithms based on blind signal separation, and these algorithms are shown to have equal performance with a linear MMSE receiver. It should be noted however, that in multipath channels, the blind adaptation schemes need some form of channel response estimation. For channel estimation, either a common pilot channel or dedicated pilot symbols can be utilized.

The formerly proposed adaptive approaches focus on the detection of the data symbols, thus requiring the signal to be cyclostationary at the symbol level. Unfortunately, this excludes their application to systems employing long pseudonoise (PN) scrambling codes, which change the correlation properties of the signal from one symbol interval to another.

In most digital radio communication systems, intersymbol interference (ISI) is introduced due to multipath propagation in the channel. This problem is significant especially at high data rates, and it may be alleviated by channel equalization.

Reference in this regard may be had to D. P. Taylor, G. M. Vitetta, B. D. Hart and A. Mämmelä, "Wireless channel equalisation," *European Transactions on Telecommunications*, vol. 9, no. 2, pp. 117–143, 1998.

In the CDMA downlink, multiple access interference is essentially caused by the channel, since all the users' signals propagate through the same frequency-selective multipath channel to the receiver of interest. Therefore, the orthogonality between the users can be restored and interference may be suppressed by compensating for the channel effects as disclosed in: S. Werner and J. Lilleberg, "Downlink channel decorrelation in CDMA systems with long codes," *IEEE International Vehicular Technology Conference*, VTC'99, Houston, Tex., May 1999.

OBJECTS AND ADVANTAGES OF THE INVENTION

It is an object and advantage of this invention to provide an improved receiver which utilizes an adaptive channel equalization function to restore the orthogonality between different users' waveforms.

It is a further object and advantage of this invention to utilize an adaptive channel equalization function in the receiver which operates to perform linear interchip interference chip cancellation by adaptive chip separation, by decorrelating consecutive transmitted chips.

It is a further object and advantage of this invention to provide a receiver with improved performance which is suited for systems using long scrambling codes such as third generation WCDMA systems.

SUMMARY OF THE INVENTION

The foregoing and other problems are overcome and the objects of the invention are realized by methods and apparatus in accordance with embodiments of this invention.

A receiver for use in a CDMA telecommunications system is disclosed. The receiver includes at least one antenna for receiving signals from a CDMA channel, where the received signals include a desired user signal. The receiver also includes combining circuitry, for performing chip waveform filtering and maximal ratio combining, to produce mutually correlated chip estimates of the received signals. The receiver further includes an adaptive separator, for adaptively separating the mutually correlated chip estimates, and a correlator, for despreading the output of the adaptive separator to obtain an estimate for data symbols of the desired user signal.

In addition, the receiver further includes estimating circuitry, coupled to the combining circuitry, for estimating a response of the channel, where the combining circuitry utilizes the channel response estimate as a reference.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

As stated above, in a synchronous CDMA downlink using orthogonal codes, multiple access interference (MAI) is essentially caused by the multipath channel. Therefore, MAI may be suppressed by linear channel equalization. A receiver using a channel equalizer algorithm is disclosed, which performs linear interchip interference cancellation by adaptive chip separation. The method is suitable for systems with long code scrambling, such as the proposed third generation wideband CDMA systems. The results are shown below to provide considerable performance gains when compared to a conventional RAKE receiver.

In an aspect of this invention, a CDMA terminal space-time adaptive receiver structure is disclosed for the downlink of CDMA systems employing long code scrambling. The receiver's ability to suppress MAI is based on equalizing the effects of the multipath channel, which essentially restores the orthogonality between different users. The adaptation rule is derived from the bootstrap principle, and its applicability here stems from the observation that the downlink signal is a sequence of uncorrelated, fairly high-powered signal elements, i.e. multiuser chips. An objective of the adaptive separation is to remove the correlation between the chips caused by the channel. Thus, the receiver performs linear channel equalization by adaptively decorrelating consecutively transmitted chips. The approach has particular application to the CDMA downlink, since the signal sent by the synchronous base station transmitter is formed by a sequence of uncorrelated multiuser chips, and it has a suitable signal-to-noise ratio for this application. Thus, the power of the entire multiple access signal can be utilized for adaptation.

I. DOWNLINK SIGNAL MODEL

A. TRANSMITTED SIGNAL

Figure 1:
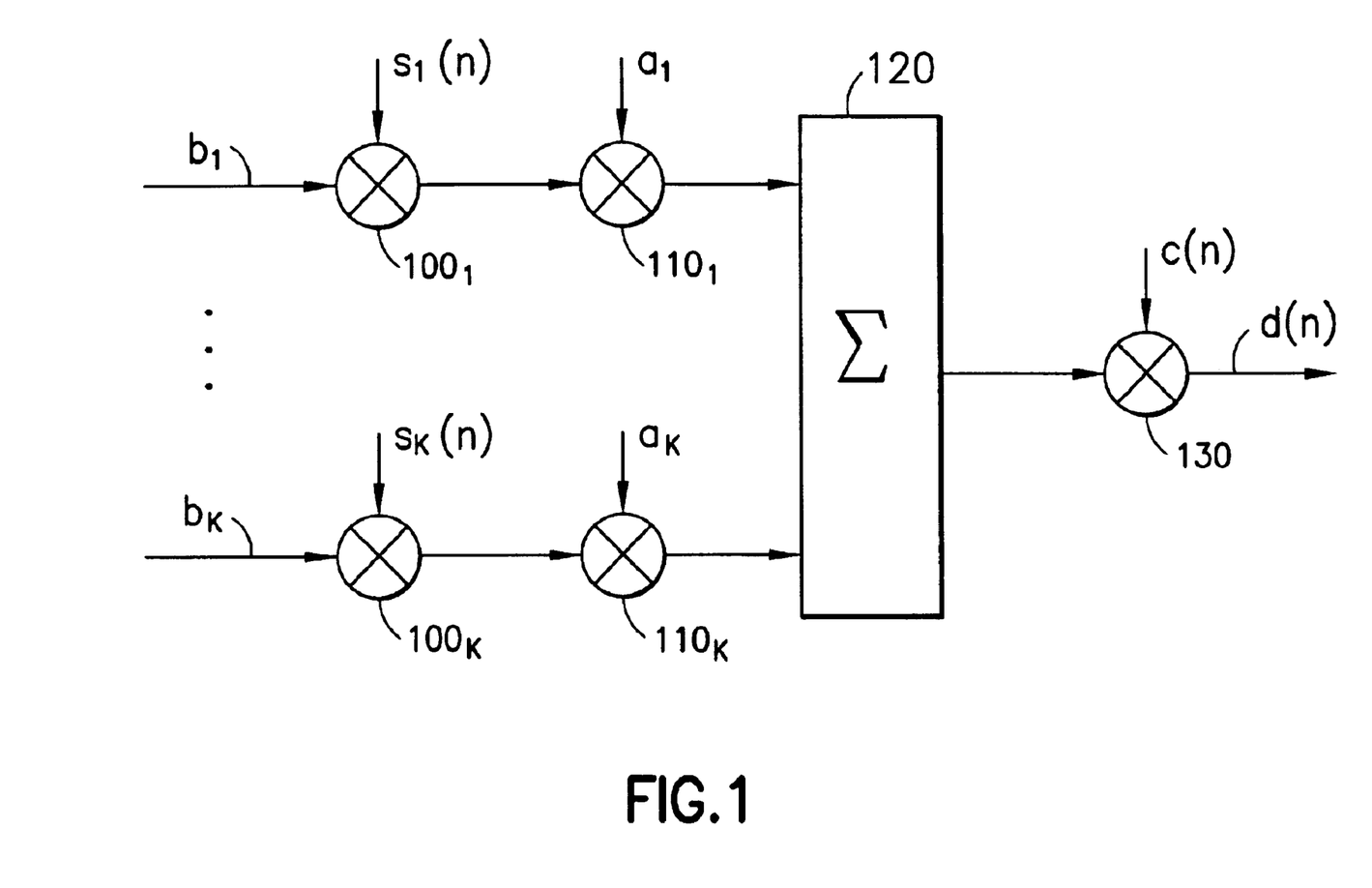
FIG. 1 shows a block diagram of a CDMA base station transmitter.

In a CDMA downlink, the different users' signals are symbol synchronous, and distinguished from each other with orthogonal (Walsh) codes. The typical structure of a single base station transmitter with K simultaneous users is depicted in FIG. 1. Signals $b_1, \ldots, b_K$ are the complex quadraphase shift keying (QPSK) data symbols for each of 1 through K users. The Walsh code for each user is represented by $s_1(n), \ldots, s_K(n)$, applied at junctions $100_1$ through $100_K$. User dependent power control amplitude is shown as $a_1, \ldots, a_K$ and is applied at junctions $110_1$ through $110_K$. The resulting signals are combined by the summation function 120. A common complex scrambling code c(n) is applied to the combined signals at junction 130. The resulting signal is shown as d(n).

The overall multiuser chip sequence is:

$$d(n) = \sum_i \sum_{k=1}^{K} a_k b_k(i) s_k(n - iN) c(n), \qquad (1)$$

where, for the kth user, $a_k$ is the real positive amplitude due to power control, $b_k(i)$ is the ith complex QPSK data symbol, and $s_k$ is the Walsh code. Here, for n=0, 1, . . . , N−1, $s_k(n)=\pm 1$, and 0 elsewhere. The period of the common complex scrambling code c(n) may extend over an entire frame of symbols. Due to the long PN code scrambling, $\{d(n)\}_n$ is a sequence of uncorrelated complex signal elements, and due to the user-dependent power control, its amplitude distribution is unknown to the receiver. However, from the adaptation point of view, d(n) represents the signal to be estimated.

The chips are given a transmission waveform p(t) of limited bandwidth. Thus the continuous time model for the multiple access baseband signal is:

$$u(t) = \sum_n d(n) p(t - n T_C), \qquad (2)$$

where $T_C$ is the chip interval duration.

B. RECEIVED SIGNAL

Due to multipath propagation, the received chip waveform at the mth receiver antenna is:

$$h_m(t) = \sum_{l=1}^{L} \gamma_{ml} p(t - \tau_l), \qquad (3)$$

where $\gamma_{ml}$ is the complex gain, and $\tau_l$ is the relative delay of the lth path of the multipath channel. Since, compared to the chip rate, the channel parameters are slowly time-varying, they may well be assumed constant over the time interval of interest. Thus the received signal at the mth antenna is:

$$r_m(t) = \sum_n d(n)h_m(t-nT_C) + \eta_m(t), \quad (4)$$

where $\eta_m(t)$ is a process of white Gaussian background noise (AWGN) with two-sided power spectral density $N_0/2$. For a matrix representation, the continuous time waveform $h_m(t-nT_C)$ may be discretized into a vector $h_m(n)$. The infinite, M-dimensional received signal may be stacked into a vector $$r = \begin{bmatrix} r_1 \\ r_2 \\ \vdots \\ r_M \end{bmatrix}, \quad (5)$$

which is given by the matrix equation $$r = Hd + \eta, \quad (6)$$

where the vector d includes the transmitted multiuser chips $$d = [\ldots d(-1)d(0)d(1) \ldots ]^T, \quad (7)$$

and the matrix H includes the received waveforms $$H = [\ldots h(-1)h(0)h(1) \ldots ], \quad (8)$$

so that each of the column vectors of matrix H, for n= ..., −1, 0, 1, ..., $$h(n) = \begin{bmatrix} h_1(n) \\ h_2(n) \\ \vdots \\ h_M(n) \end{bmatrix}, \quad (9)$$

represents the received waveform conveying the information of the transmitted multiuser chip d(n).

II. ADAPTIVE RECEIVER

A. OVERALL RECEIVER STRUCTURE

Figure 2:
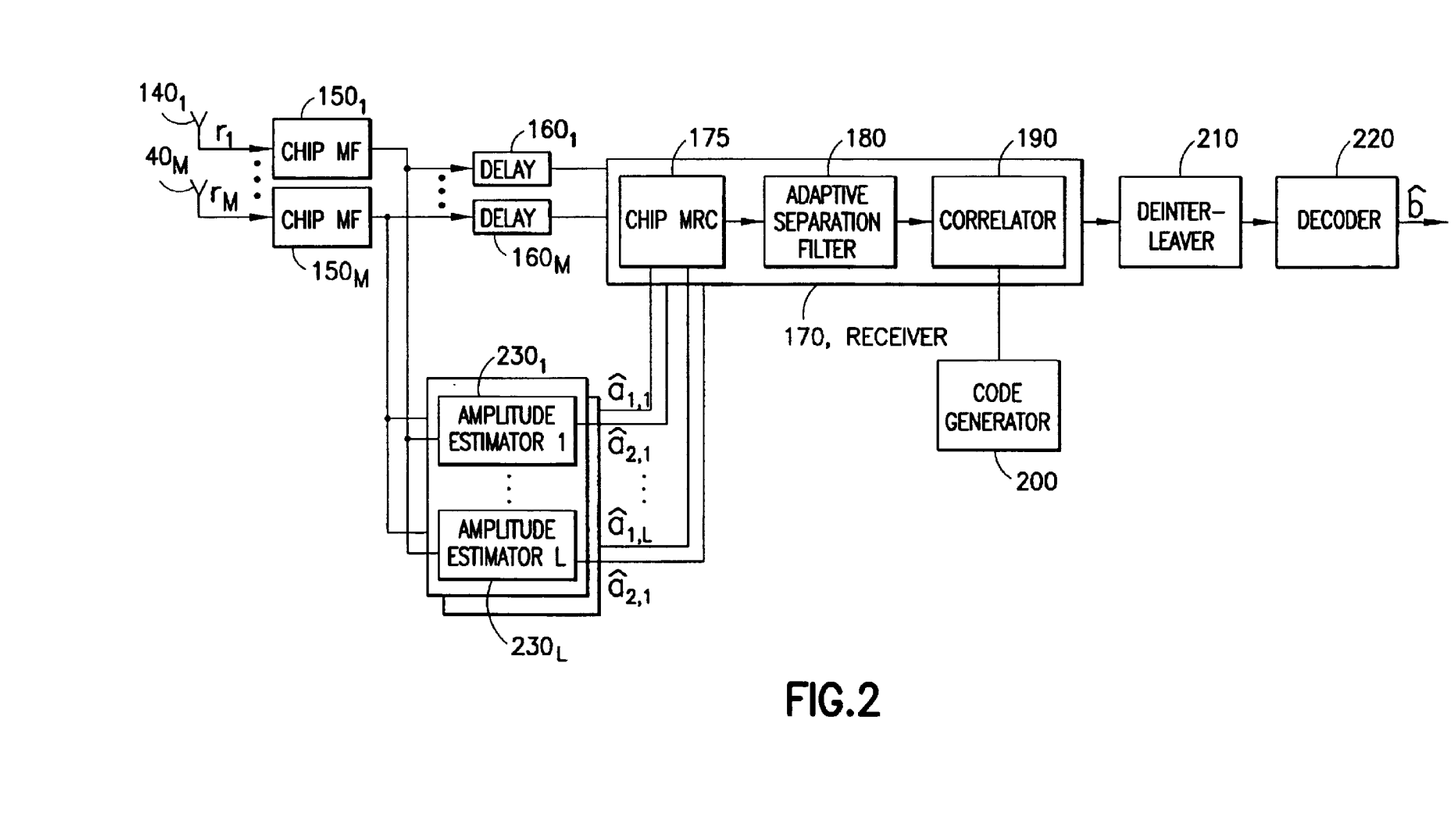
FIG. 2 shows a block diagram of a receiver in accordance with an aspect of this invention.

A block diagram of the structure of the receiver 10 is depicted in FIG. 2. Signals $r_1(t)$ through $r_M(t)$ are received through at least one or a plurality of antennas $140_1, \ldots, 140_M$, which are each coupled to a corresponding chip matched filter $150_1, \ldots, 150_M$. Each chip matched filter $150_1, \ldots, 150_M$, produces at least one sample per chip at its output. The chip sample sequences pass through delays $160_1, \ldots, 160_M$, to compensate for possible channel estimation delay.

In order to determine the mutually correlated chip estimates, the receiver 170 includes a unit, designated Chip MRC 175, for performing chip maximal ratio combining (MRC) over multipath components and antenna elements. The operation corresponds to channel matched filtering, and as such, minimizes the signal dimensionality with no loss of information prior to equalization.

Reference in this regard may be had to: I. Kaya, A. R. Nix and R. Benjamin, "Exploiting multipath activity using low complexity equalisation techniques for high speed wireless LANs," *IEEE International Vehicular Technology Conference*, VTC'98, Ottawa, Canada, May 1998, pp. 1593–1597.

The mutually correlated chip estimates are adaptively separated by the adaptive separation filter 180. The output of the adaptive separation filter 180 is coupled to a correlator 190 which operates to obtain estimates for the desired users' data symbols by despreading the signal, i.e. by multiplying with a conjugated long scrambling code and user specific Walsh code, supplied by a code generator 200, and then integrating over the symbol period. The output of the correlator 190 is coupled to a deinterleaver 210 which in turn is coupled to a decoder 220. The deinterleaver 210 and the decoder 220 could be conventional in construction and operation.

Assuming perfect knowledge of the channel, the nth output element of the Chip MRC 175 is:

$$x(n) = h^H(n)r = \sum_{m=1}^{M} \sum_{l=1}^{L} \gamma_{ml}^* \int r_m(t)p(t-nT_c-\tau_l)dt, \quad (10)$$

where ( )* denotes taking complex conjugate and ( )$^H$ Hermitian transpose. In matrix form, the total output sequence $x = [\ldots, x(-1), x(0), x(1), \ldots]^T$ is $$x = H^H r = Pd + H^H \eta, \quad (11)$$

where the correlation matrix $P = H^H H$ is denoted.

In practice, instead of known $\gamma_{ml}$, coherent combining employs estimates $\hat{a}_{m,l} \approx \gamma_{ml}$ for m=1, ..., M and l=1, ..., L of the channel response provided by amplitude estimators $230_1, \ldots, 230_L$.

These estimations may be based on dedicated pilot symbols or on a common pilot channel, received through antennas $140_1, \ldots, 140_M$.

From equation (11), it can readily be seen that by multiplying the vector x from the left with $P^{-1}$, chip decorrelation or zero-forcing equalization is performed. However, such an operation offers little advantage due to considerable noise enhancement.

B. ADAPTIVE SEPARATION

Figure 3:
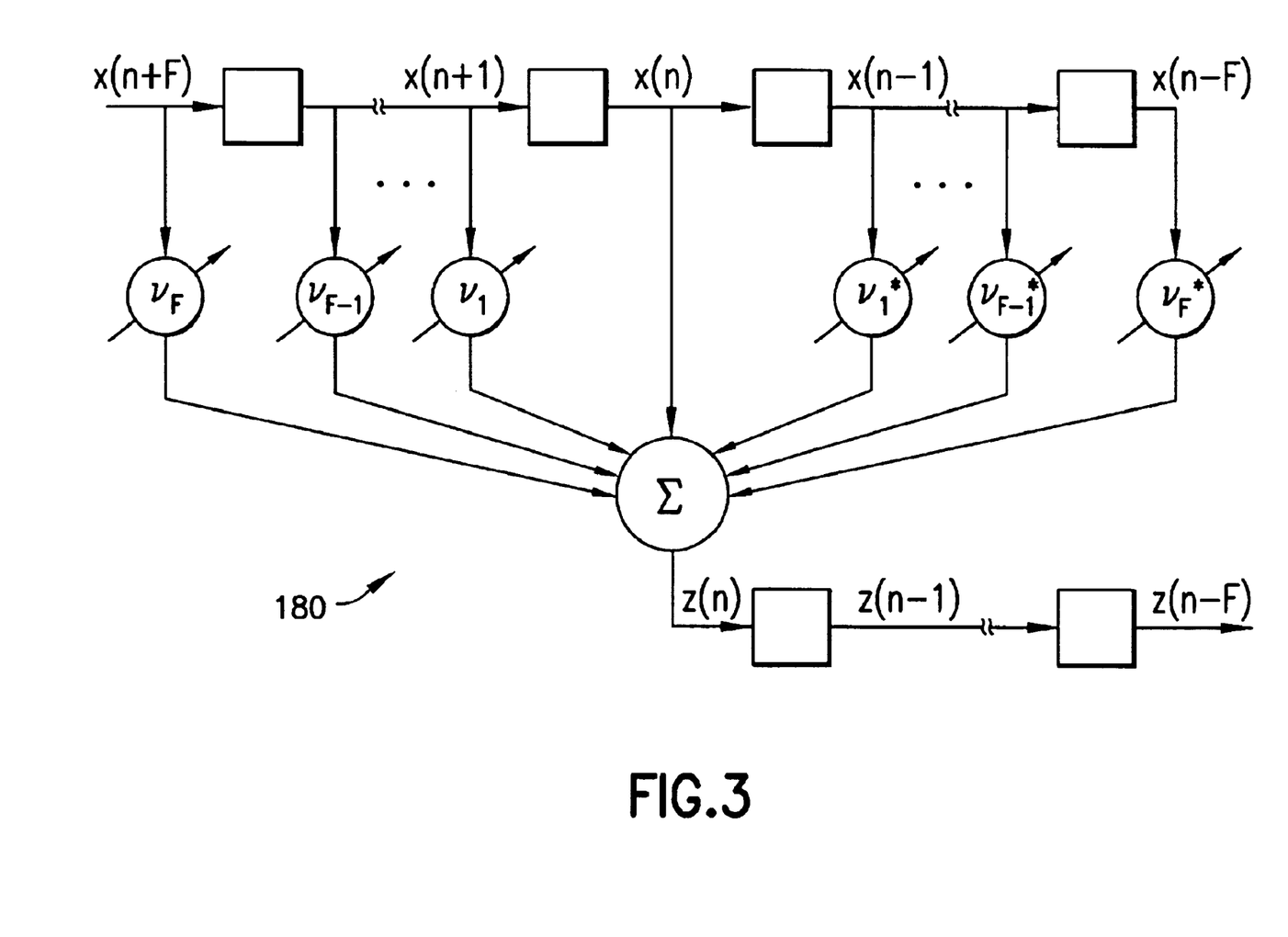
FIG. 3 shows a block diagram of the structure of an adaptive separation filter in accordance with the teachings of this invention.

Due to multipath propagation, the combined chips are mutually correlated. The objective of the adaptive separation filter 180 is to remove this correlation. Since the correlation matrix P is of Toeplitz form, the separation is reduced into a filtering problem. As depicted in FIG. 3, a symmetric filter v is used. Ideally, the filter is infinitely long, but in practice it may be truncated into a manageable length. A suitable filter length may be determined primarily by the channel delay spread. By denoting:

$$x(n) = \begin{bmatrix} x(n-F) \\ \vdots \\ x(n-1) \\ x(n) \\ x(n+1) \\ \vdots \\ x(n+F) \end{bmatrix}, \text{ and } v(n) = \begin{bmatrix} v_F(n) \\ \vdots \\ v_1(n) \\ 1 \\ v_1^*(n) \\ \vdots \\ v_F^*(n) \end{bmatrix},$$

where 2F+1 is the filter length, the output of the separation filter 180 may be expressed as $$z(n) = v^H(n)x(n). \quad (12)$$

Similarly to the above mentioned bootstrap algorithm described by Y. Bar-Ness and J. B. Punt, the adaptation is based on blind linear decorrelation. The adaptation step of the weights, for f=1, 2, ..., F, may be expressed as:

$$v_f(n+1) = v_f(n) - \mu(n)z^*(n)z(n-f), \quad (13)$$

where $\mu(n)$ is the (possibly normalized) step-size parameter. Note that in the initial condition, $v_f=0$, for f=1,2, ..., F, the overall receiver acts as a conventional RAKE receiver.

From equation (13) it can be shown that when the adaptation has reached the steady state (in the mean), the condition $$E(z^*(n)z(n-f))=0, f=1, 2, \ldots, F \qquad (14)$$

is satisfied. When the noise level is insignificant, this condition is also satisfied by a zero-forcing equalizer.

It should be noted that the steady-state filter weights cannot be solved from equation (14) without ambiguity, and that the algorithm does not offer global convergence. However, simulations have shown that the adaptation is stable if the step-size is kept reasonably small.

III. PERFORMANCE EVALUATION

In this section, the results of the computer simulations determining the bit error rate (BER) performance of the adaptive chip separator, are presented, and compared to those of a conventional RAKE receiver. Consider a WCDMA downlink signal with K active, equal power users, QPSK data modulation and real orthogonal Walsh codes of length N=4 or 32, along with a long complex Gold sequence for scrambling. A fixed step-size parameter is used for adaptation, and the separation filter length is set to 17 (F=8). Error correction coding is excluded from the simulations.

The receivers are tested in a time-varying Rayleigh channel with delay spread 1 µs, with three resolvable paths of equal average powers, each independently fading according to a classical Doppler spectrum. A chip rate of 4 MHz with root raised cosine pulse shape filtering, a carrier frequency of 2 GHz, and a vehicle speed of 5 km/h are used in the simulations. Both single-antenna, and two-antenna receivers are simulated. In the two-antenna case, full diversity due to independent fading between the elements is assumed. Perfect estimates of the channel impulse response are given to the receivers.

Figure 4:
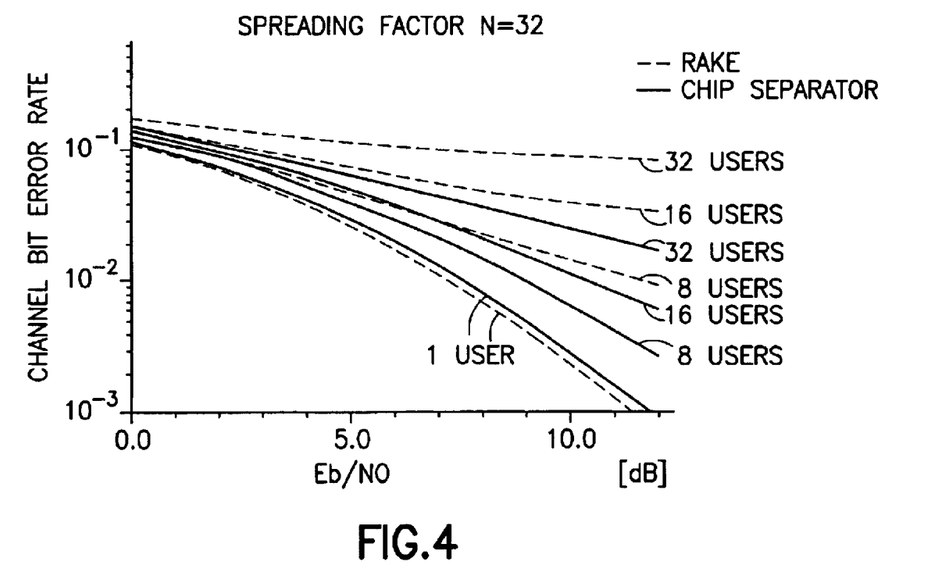
FIG. 4 shows the bit error rate (BER) performance curves of the receiver using a spreading factor N=32 and a single receiver antenna.
Figure 5:
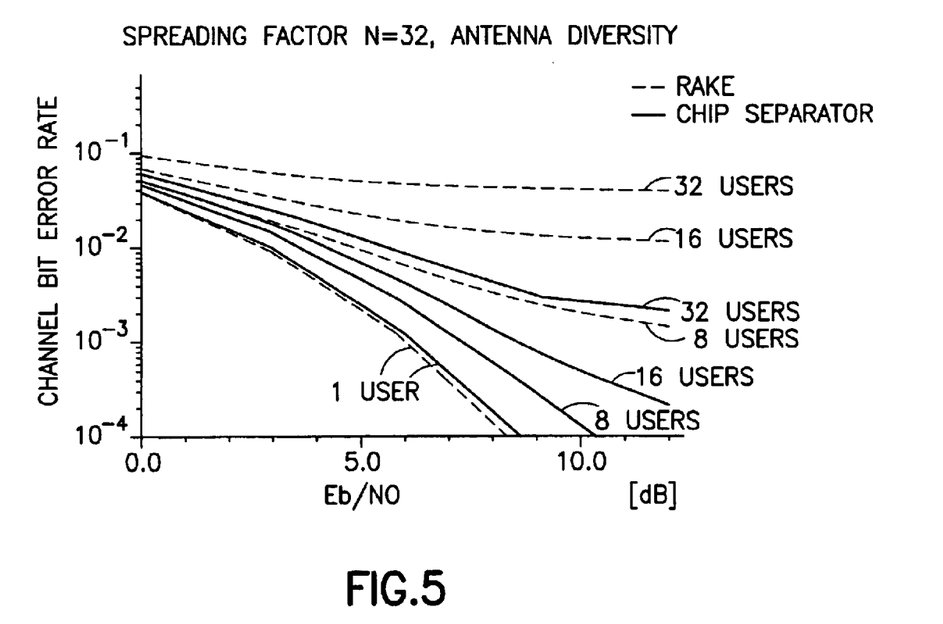
FIG. 5 shows the BER performance curves using a spreading factor N=32 and a two antenna receiver.
Figure 6:
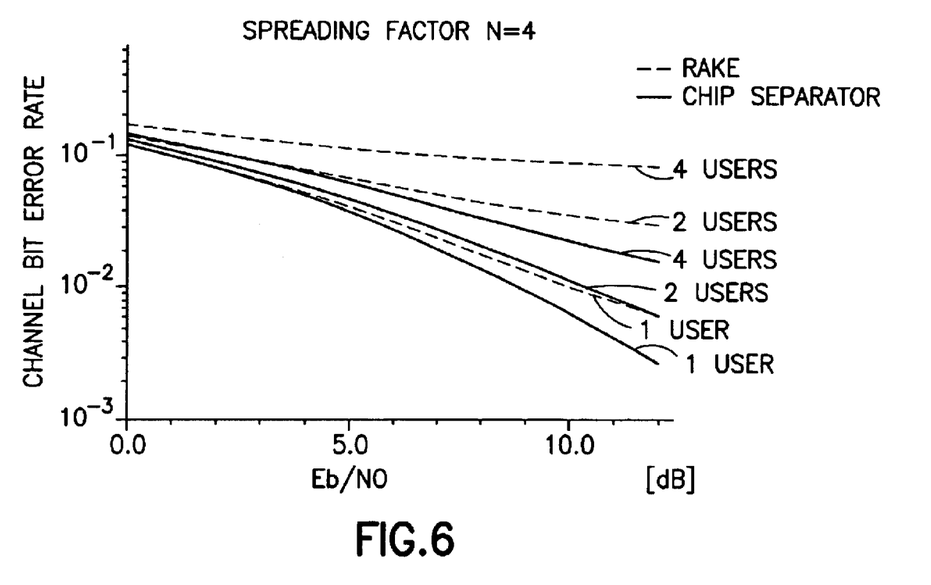
FIG. 6 shows the BER performance curves when using a spreading factor N=4 and a single receiver antenna.
Figure 7:
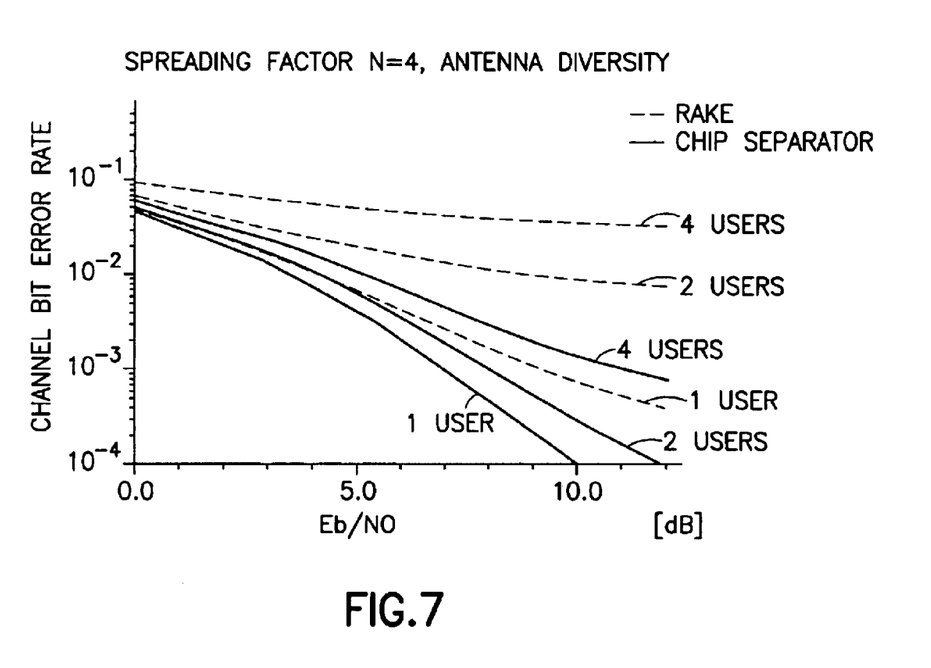
FIG. 7 shows the BER performance curves when a spreading factor N=4 has been used with a two antenna receiver.

In FIG. 4, the BER performance curves of single antenna receivers in the case of spreading factor N=32, with variable number of users, are depicted. The performance of the two-antenna receivers in the corresponding channel load situations are shown in FIG. 5. Here, the x-axis indicates the $E_b/N_0$ per antenna element. The results for the single- and two-antenna receivers in the low spreading factor N=4 situation are given in FIGS. 6 and 7, correspondingly.

As can be seen, the chip separator offers considerable gain compared to RAKE especially in heavily loaded channels. The separator also seems to benefit more from the extra dimension given by the diversity antenna. In the single user case of low data rate and large spreading factor N=32, however, the detection performance is just slightly decreased due to adaptation jitter. It is worth noting though, that a high data rate user with N=4, clearly benefits from the separation even in the single user case.

The simulations show that the adaptive chip separator outperforms the conventional RAKE receiver, especially at high data rates when the spreading factor is small, or when the system is heavily loaded by multiple users.

It should be understood that that the functions described herein may be implemented with discrete circuit elements, or as software routines that are executed by a suitable data processor. A combination of circuit elements and software routines may also be employed.

Thus, while the invention has been particularly shown and described with respect to preferred embodiments thereof, it will be understood by those skilled in the art that changes in form and details may be made therein without departing from the scope and spirit of the invention.

What is claimed is:

1. A receiver for use in a CDMA telecommunications system, comprising:

at least one antenna for receiving signals from a CDMA channel, said signals comprising a desired user signal;

combining circuitry, coupled to said antenna, for performing chip waveform filtering and maximal ratio combining over multipath components and antenna elements to produce mutually correlated chip estimates of said received signals;

an adaptive separator, coupled to said combining circuitry, for adaptively separating said mutually correlated chip estimates; and a correlator, coupled to said adaptive separator, for despreading an output of said adaptive separator to obtain an estimate for data symbols of said desired user signal.

2. The receiver of claim 1, further comprising estimating circuitry, coupled to said combining circuitry, for estimating a response of said channel, and wherein said combining circuitry utilizes said channel response estimate as a reference.

3. A receiver for use in a CDMA telecommunications system, comprising:

at least one antenna for receiving signals from a CDMA channel, said signals comprising a desired user signal;

combining circuitry, coupled to said antenna, for performing chip waveform filtering and maximal ratio combining over multipath components and antenna elements to produce mutually correlated chip estimates of said received signals;

an adaptive separator, coupled to said combining circuitry, for adaptively separating said mutually correlated chip estimates; and a correlator, coupled to said adaptive separator, for despreading an output of said adaptive separator to obtain an estimate for data symbols of said desired user signal, wherein said despreader further comprises circuitry for multiplying said output of said adaptive separator with a conjugated long scrambling code and a Walsh code, and then to integrate the result over a symbol period.

4. A method for receiving signals in a CDMA telecommunications system, said method comprising:

receiving signals from a CDMA channel, said signals comprising a desired user signal;

performing chip waveform filtering and maximal ratio combining over multipath components and antenna elements to produce mutually correlated chip estimates of said received signals;

adaptively separating said mutually correlated chip estimates; and despreading said separated chip estimates to obtain an estimate for data symbols of said desired user signal.

5. The method of claim 4, further comprising estimating a response of said channel, and wherein said step of performing chip waveform filtering and maximal ratio combining further comprises utilizing said channel response estimate as a reference.

6. A method for receiving signals in a CDMA telecommunications system, said method comprising:

receiving signals from a CDMA channel, said signals comprising a desired user signal;

performing chip waveform filtering and maximal ratio combining over multipath components and antenna elements to produce mutually correlated chip estimates of said received signals;

adaptively separating said mutually correlated chip estimates; and despreading said separated chip estimates to obtain an estimate for data symbols of said desired user signal, wherein despreading further comprises multiplying said adaptively separated chip estimates with a conjugated long scrambling code and a Walsh code, and then integrating the result over a symbol period.

7. A receiver for receiving a spread spectrum signal from a multipath channel, comprising:

input circuitry, for coupling to N receive antennas, for generating mutually correlated chip estimates;

a separator filter, coupled to an output of said input circuitry, for adaptively separating said mutually correlated chip estimates; and a despreader, coupled to an output of said separator filter, for generating desired user symbol estimates from the adaptively separated chip estimates.

8. The receiver of claim 7, where said input circuitry comprises, for each of said N antennas, a channel response estimator.

9. The receiver of claim 8, where said input circuitry further comprises a chip maximal ratio combiner that receives as inputs, from each of said N antennas, chip samples and also outputs from each of said N channel response estimators, said chip maximal ratio combiner outputting the mutually correlated chip estimates to said separator filter.

10. The receiver of claim 8, where N is an integer that is equal to or greater than one.

* * * * *